Sept. 1, 1936.  H. JACKSON ET AL  2,053,035
PROTECTIVE APPLIANCE
Filed March 26, 1935   5 Sheets-Sheet 1
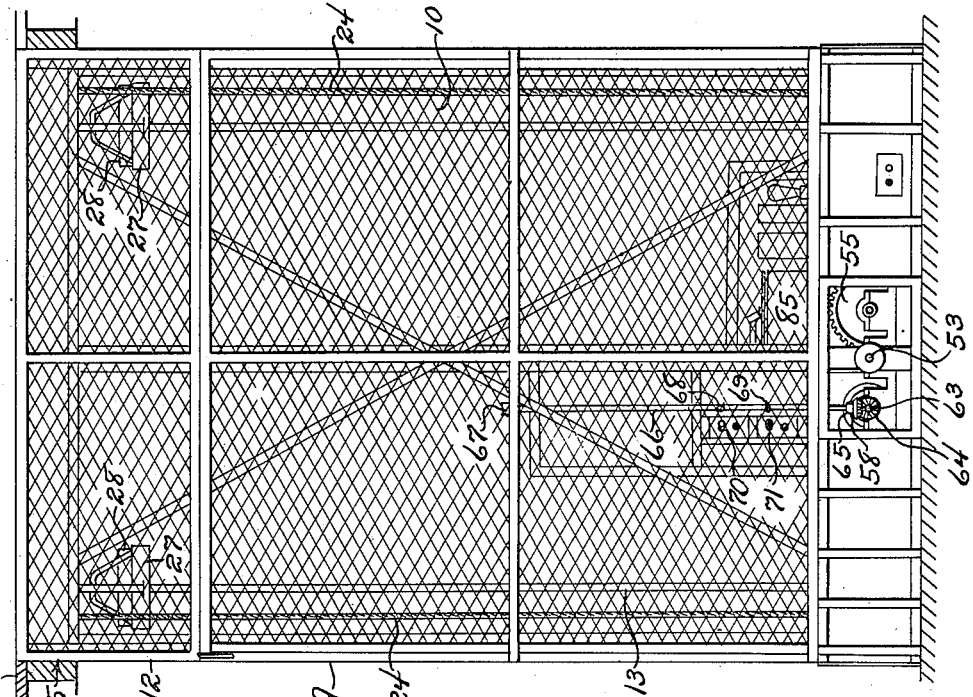
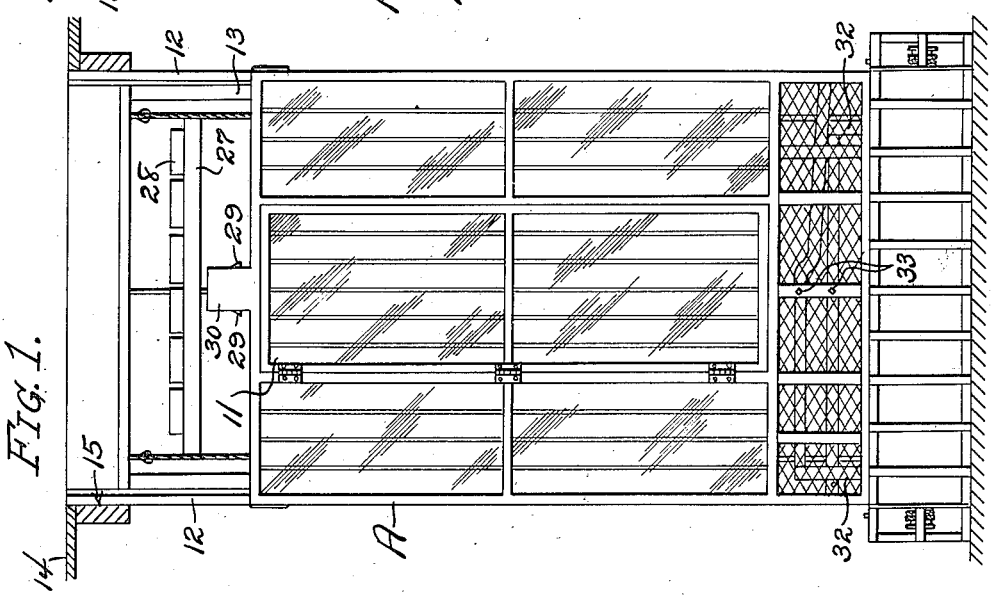
Harry Jackson
Mary E. Jackson
INVENTORS
BY Victor J. Evans & Co.
ATTORNEYS

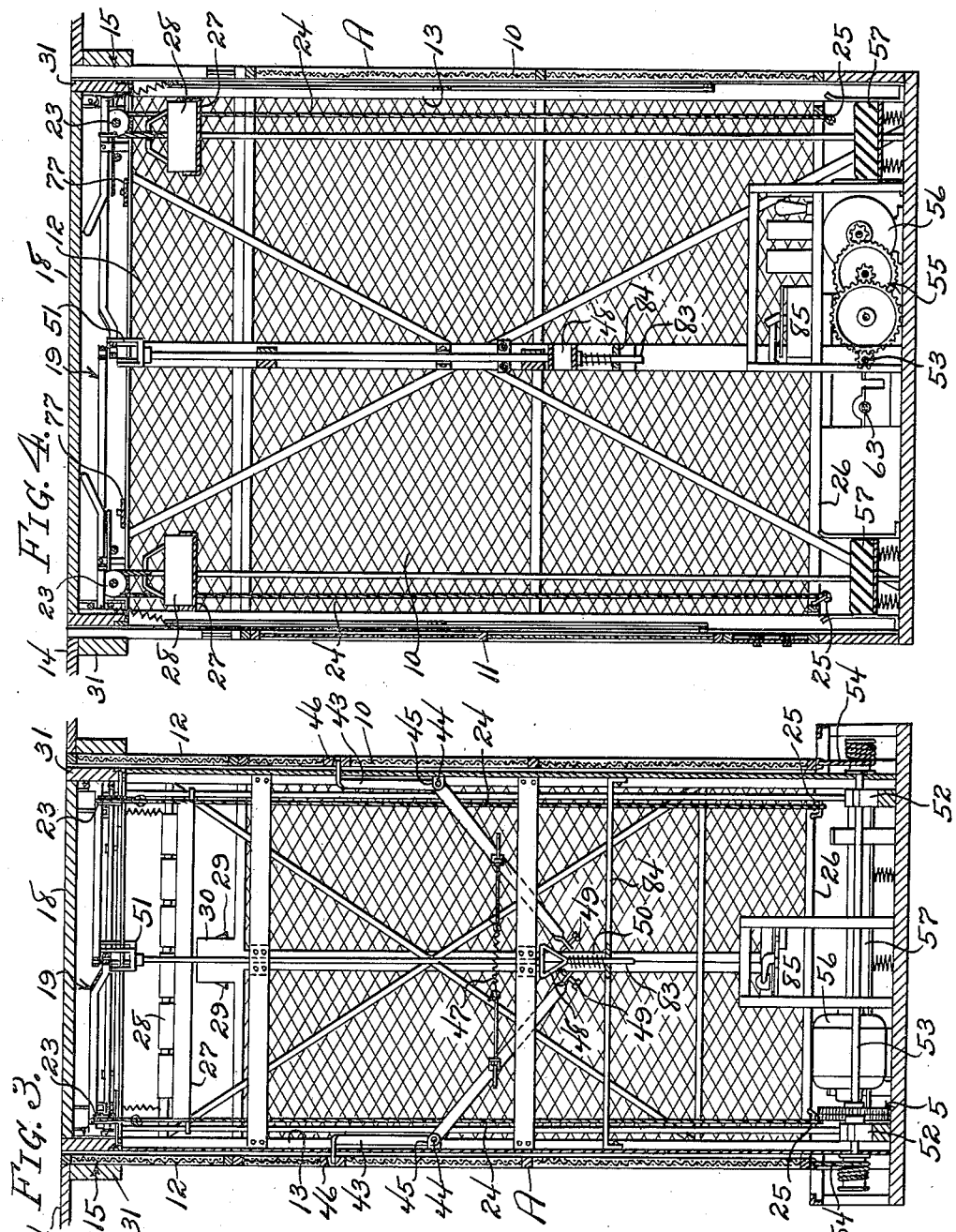

Sept. 1, 1936.  H. JACKSON ET AL  2,053,035
PROTECTIVE APPLIANCE
Filed March 26, 1935  5 Sheets—Sheet 3
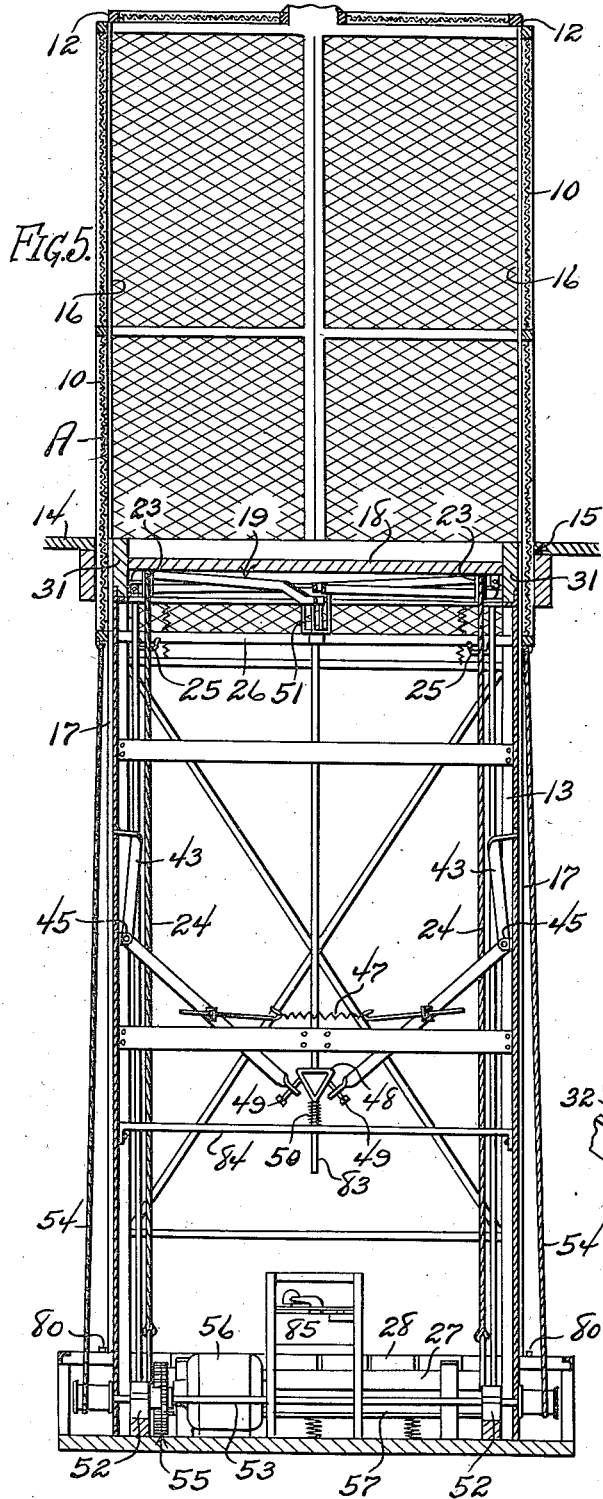
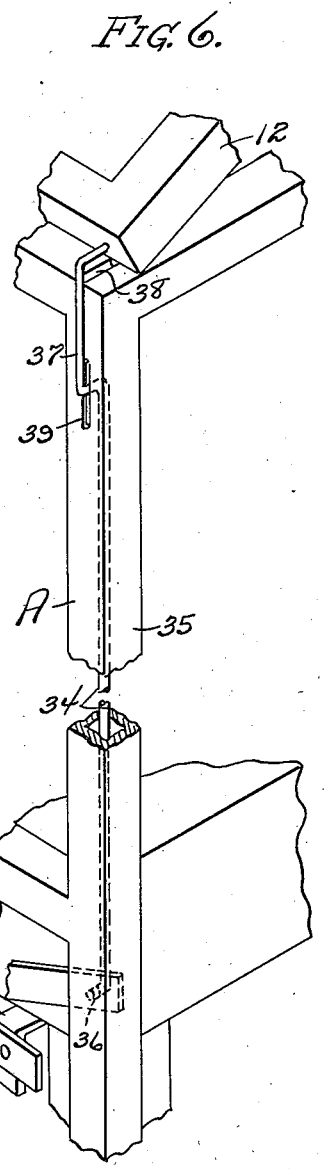
Harry Jackson
Mary E. Jackson
INVENTORS
BY Victor J. Evans & Co.
ATTORNEYS Sept. 1, 1936.                H. JACKSON ET AL                2,053,035
                              PROTECTIVE APPLIANCE
                         Filed March 26, 1935        5 Sheets-Sheet 4

Harry Jackson
Mary E. Jackson
INVENTORS
BY Victor J. Evans & Co.
ATTORNEYS

Sept. 1, 1936.   H. JACKSON ET AL   2,053,035
PROTECTIVE APPLIANCE
Filed March 26, 1935   5 Sheets-Sheet 5

Harry Jackson
Mary E. Jackson
INVENTORS

BY Victor J. Evans & Co.
ATTORNEYS

Patented Sept. 1, 1936

2,053,035

UNITED STATES PATENT OFFICE 2,053,035

PROTECTIVE APPLIANCE

Harry Jackson and Mary E. Jackson, Harrisburg, Pa.

Application March 26, 1935, Serial No. 13,132

5 Claims. (Cl. 43—59)

The invention relates to a protective apparatus and more especially to an electro-mechanical robber's trap involving refinements over the subject matter of an application for United States Letters Patent bearing Serial No. 749,607 and filing date of October 23, 1934, the said application having been allowed on February 14, 1935.

The primary object of the invention is the provision of an apparatus or trap of this character, wherein the trapping cage which is supported for vertical movement incases the mechanism for the automatic operation of this cage and such mechanism is inaccessible to a person when trapped by the cage and exit of such trapped person being prevented so that an escape can not be made.

Another object of the invention is the provision of an apparatus or trap of this character, wherein the working parts embody refinements over the subject matter of the application for United States Letters Patent, filed October 23, 1934, bearing Serial No. 749,607 and formally allowed February 14, 1935, as well as elimination of a considerable number of parts disclosed in the aforesaid application with the result that a more perfect operation of such apparatus or trap is had and automatically effected.

A further object of the invention is the provision of an apparatus or trap of this character, which embodies simplicity of construction, reliability and efficiency in the operation thereof, and economical for construction and installation.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a fragmentary vertical sectional view through the flooring of an enclosure, as, for example, a bank showing the apparatus or trap constructed in accordance with the invention built into the flooring.

Figure 2 is a side elevation with the parts in the position shown in Figure 1.

Figure 3 is a vertical sectional view.

Figure 4 is a view similar to Figure 3 taken at right angles thereto.

Figure 5 is a view similar to Figure 3 showing the trapping cage in raised or elevated position.

Figure 6 is an enlarged fragmentary detail view showing the manner of closing the top of the cage.

Similar reference characters indicate corresponding parts throughout the several views in the drawings.

Figure 7:
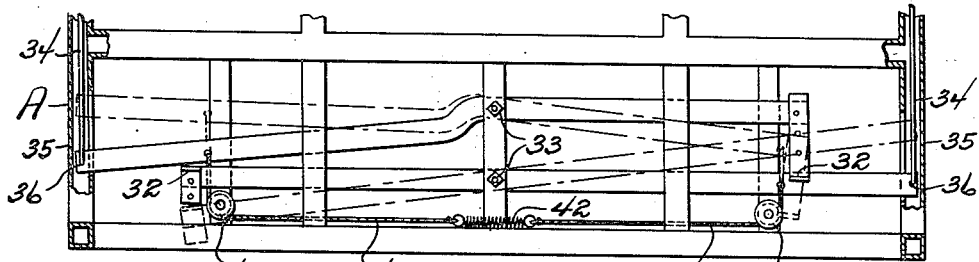
Figure 7 is an enlarged fragmentary elevation partly in section of the mechanism for closing the cage top.

Referring to the drawings in detail, the apparatus or trap comprises a vertically movable cage or trapping closure A which is composed of bottom, side, end and top frames of suitable construction, the bottom and top frames being open while the side and end frames have fitted therein gratings or strong wire mesh fabric 10. It is preferable to provide at the front side of the cage A a doorway closed by a door 11 suitably equipped with the requisite locking mechanism, while at the open top frame of the cage are vertically swinging trap doors 12 which when lowered effect a complete closing of the open top of the cage.

The cage or closure A is arranged for vertical travel outside of a columnar housing or framing 13 and serves as a guard or fencing for such framing when the said cage is in its lowermost position. This housing or framing 13 is made firm or secure to a foundation, flooring or the like (not shown) beneath the main floor or its equivalent, a portion 14 thereof for a bank or other building being shown and this housing or framing 13 extends upwardly to an opening 15 provided in said floor 14, the opening serving as a passage for the cage or closure A to permit it to be elevated or raised above the floor 14 for a purpose presently to be described.

At opposite sides of the cage or closure A are traction runners or rails 16, these being engageable with tracks 17 fixed to opposite sides of the housing or framing 13 to properly guide the vertical travel of said cage or closure.

Figure 8:
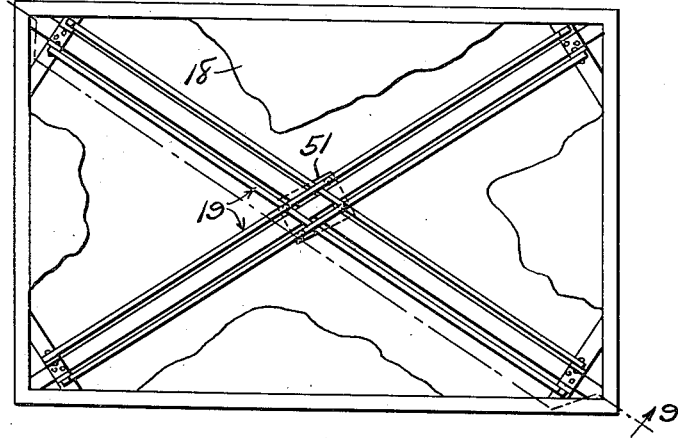
Figure 8 is a plan view of the platform operated levers.
Figure 9:
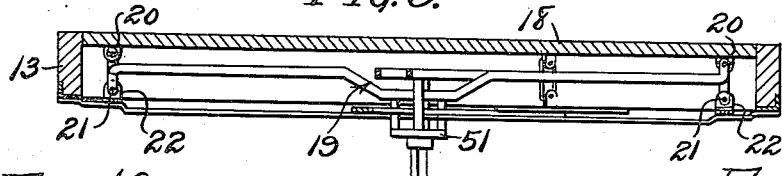
Figure 9 is a sectional view on the line 9—9 of Figure 8 looking in the direction of the arrows.
Figure 10:
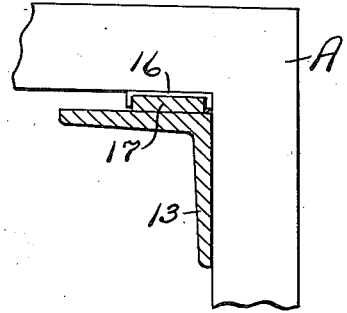
Figure 10 is a fragmentary enlarged composite plan and sectional view detailing the guide for the cage.
Figure 11:
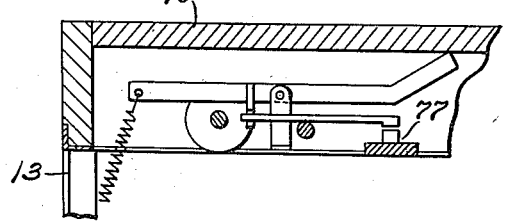
Figure 11 is a fragmentary vertical sectional view showing in detail the platform operated switch.
Figure 12:
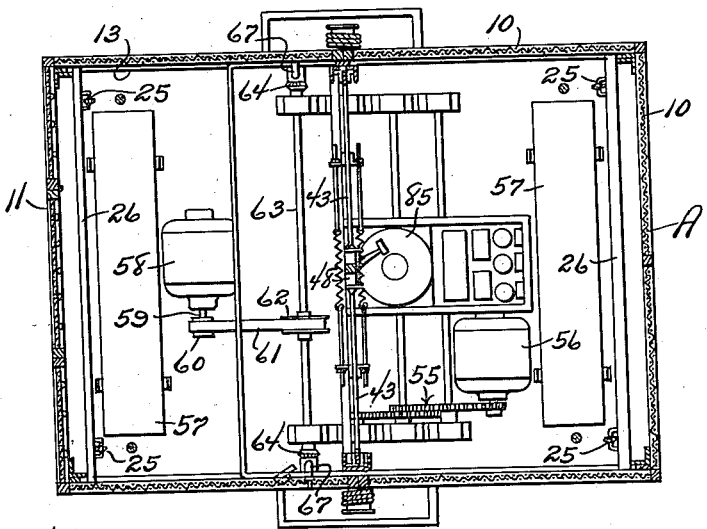
Figure 12 is a horizontal sectional view through the apparatus.
Figure 13:
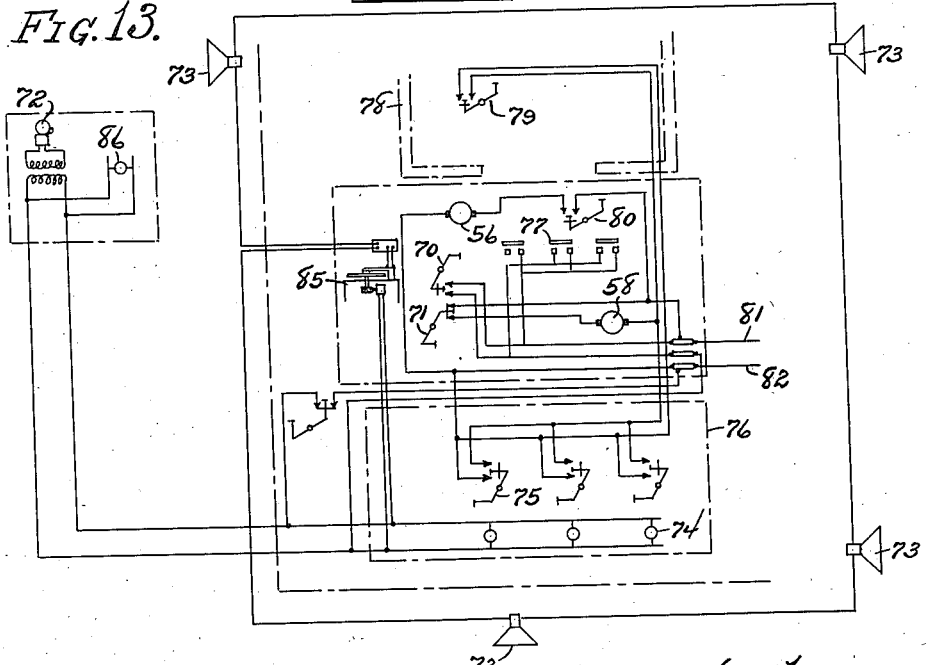
Figure 13 is a diagrammatic plan view of the circuit layout as employed with the apparatus or trap.

The housing or framing 13 at its upper end protrudes the required distance within the opening 15 in the floor 14, and upon this upper end is fitted a tread platform or depressible foot piece 18 which at its tread surface normally lies flushed with the floor 14. The platform or foot piece 18 is mounted upon a group of rocking levers 19; a set of these are pivoted at 20 to the under side of the platform and are diagonally arranged in crossing relation to each other in X form as shown in Figure 8 of the drawings while another set of these levers are pivoted at 21 to supports 22 therefor, the latter being carried by the housing or framing 13. The set of levers 19 pivoted to the platform or foot piece 18 play upon the supports 22 while the set of levers 19 pivoted to the supports play upon the under side or face of said platform or foot piece, the purpose of these sets of levers being hereinafter fully described.

Suitably journaled at the upper end of the housing or framing 13 and disposed at opposite sides of the same are pulleys 23, these having trained thereover weight cords or cables 24 which at their lower ends are anchored at 25 to cross struts 26 of the housing or framing 13. The cross struts 26 are located at the lower portion of said housing or framing 13, while the other ends of these cords or cables 24 carry racks 27 receiving weights 28 functioning as overbalance weights. It is, of course, understooood that the number of weights 28 can be varied in the racks 27 as the occasion may require for the automatic raising of the cage or closure A, as when the latter is free for travel the said weights 28 become effective for the automatic elevating or raising of the cage or closure to extend the same through the opening 15 in the floor 14 at a height above the latter whereby a person or persons standing upon the platform or foot piece 18 will be trapped within said cage or closure. Normally the cage or closure A is beneath the floor 14 to be out of sight.

The trap doors 12 are suitably hinged to the top frame of the cage or closure A and are opposite each other to swing vertically and when in open position are parallel or align with opposite sides of the cage or closure A and when closed are fastened in this position by spring latches 29, these being hand releasable. The latches 29 are arranged in pairs upon supporting blocks 30 fixed to and rising from the cage or closure A as disclosed in Figure 1 of the drawings, these blocks 30 being unitary with said cage or closure. In the arrangement of the pairs of latches 29, those of each pair are located opposite each other upon their companion block 30.

At opposite sides of the opening 15 in the floor 14 are abutments 31 for trips 32, these being pivoted at 33 upon said cage or closure to have the said trips project in the path of the abutments 31 at the upper end of the housing or framing 13, so that said trips on the cage or closure reaching its complete elevation will operate plungers 34 slidably fitted in hollow posts 35 and pivoted at 36 to said trips whereby the offset portions 37 of these plungers 34 actuate the trap doors 12 to move the same to closing position when normally aligned with the sides of the cage or closure, the offset portions 37 normally being held in counterseats 38 provided in the top frame of the cage or closure A. To guide each plunger 34 in its vertical movement there is provided an elongated slot 39 in the post 35. These trips 32 have connected therewith cables 40 trained over pulleys 41 and are united with each other by a coiled retractile spring 42 which holds the trips 32 under tension and return the same to normal position to have the offset portions 37 engaged in the counterseats 38, and in this position the trap doors 12 are in open condition aligned with the sides of the cage or closure A.

Located within the housing or framing 13 at an intermediate point thereof is a pair of opposed locking members 43, these being pivoted at 44 in supporting brackets 45 carried by said housing or framing, and the said locking members 43 are adapted to engage in keeper notches or recesses 46 provided in the cage or closure A when the latter is in its lowermost position to lock the same from rising or becoming elevated. The locking members 43 have connected therewith an adjustable coiled retractile spring 47 which urges these members to locking position. Suspended centrally with relation to the platform or foot piece 18 is a shiftable releasing key 48 engageable with adjustable striker bolts 49 carried by the locking members 43 so that when the platform or foot piece is depressed these locking members 43 will be automatically unlocked from the cage or closure A whereby the latter under the weights 28 will be caused to travel upwardly to an elevated position above the floor 14 for the trapping of a person or persons when standing upon the platform or foot piece. The key 48 is tensioned by a spring 50 for urging the same upwardly, and at the upper end of this key is a saddle 51 occupied by the levers 19 and under the lowering movement of the platform or foot piece according to the load required for depressing the same the locking members 43 will be actuated.

Mounted in suitable bearings 52 located in the lower portion of the housing or framing 13 is a horizontally disposed windlass shaft 53 by which is adapted to be wound and unwound a pair of lowering cords or cables 54, these having connection with the bottom frame of the cage or closure A. Upon the winding of such cords or cables 54 by the shaft 53 when the cage or closure A is in its highest elevation the latter will be caused to be lowered to its lowermost position. The shaft through a gear train 55 is driven from an electric motor 56.

Built within the housing or framing 13 at the bottom thereof are bumpers 57 arranged in the path of the weight racks 27 and these bumpers are resiliently supported to absorb shock due to the impact of the weight racks 27 therewith when the cage or closure A has moved to its upmost position.

Supported in any suitable manner within the housing or framing 13 is an electric motor 58, its power shaft 59 carrying a pulley 60 over which is trained an endless belt 61, the same being also trained over a pulley 62 of a driven shaft 63 which also has fixed thereto beveled pinions 64 meshing with pinions 65 upon turning rods 66 journaled vertically and these rods at their upper ends have jaws 67 for engaging with the cage or closure A when the same is in lowered position. One of these rods carries a pair of switch actuating arms 68 and 69, respectively, for action upon the respective push button switches 70 and 71, respectively, these being suitably carried by the housing or framing 13 in the path of movement of said arms 68 and 69 upon the rod which is turned by the motor 58 when operated. The switch 70 is arranged in an electric circuit including the audible signals 72 and 73 and visual signals 74, respectively, while the switch 71 is included in an electric circuit having the motor 56 arranged therein, this switch 71 being normally closed, while the switch 70 is normally open. In the motor circuit having the switch 71 there is arranged in parallel several foot operated switches 75, these being conveniently located at the teller's desk or counter 76, so that they can be manually operated for closing, whereby the said motor 56 can be set into action.

Beneath the platform or foot piece 18 are arranged normally open electric switches 77, these being common to or included in the circuit for the audible and visible signals 72, 73 and 74, respectively, so that when the platform is depressed such switches 77 will close and the audible and visible signals will be operated. It is, of course, understood that in the locating of the cage or closure A the platform or foot piece 18 of the apparatus or trap is disposed directly in front of the entrance to a vault 78 so that should an intruder attempt to make entry to this vault, it is necessary that he tread upon the platform or foot piece 18 and under the depressing thereof by the weight of such intruder the audible and visible signals are operated. Located within the vault 78 is a switch 79, the same being normally open and included in the circuit with the switches 75 so that in event of any of the personnel of the bank being trapped within the vault or being within the vault when the intruder of the said vault approaches for invasion, by operating the switch 79 the motor 58 circuit will be closed for the operation of the cage or closure A.

The motor 56 has in its circuit the normally open switch 80 which is located in the descending path of the cage or closure A. It is, of course, understood that when the cage or closure A is in its complete elevated position this switch 80 can be manually closed and thus the motor 56 set in operation, which effects the lowering of the cage or closure, and when the latter reaches its lowermost position it will operate upon the switch 80 to open the same and thus shut off this motor.

These circuits before stated receive current from the wires 81 and 82, respectively, of a power line.

When the cage or closure A is in its lowermost position it is, of course, understood that the rods 66 with the jaws 67 will be manually turned so that the jaws will latch the cage or closure to assist in holding it in lowered position. When the cage or closure A reaches its lowermost position and the load has been relieved from the platform or foot piece 18 the locking members 43 lock said cage or closure in this position, and at the same time the jaws 67 will assist in further latching the said cage or closure.

In this lowermost position of the cage or closure the gear train 55 is relieved from the motor 56 so that there can be no drag or retarding of the elevation of the cage or closure for trapping purposes. The key 48 for the locking members 43 is provided with a guide stem 83 operating through a cross bar 84 horizontally fixed within the housing or framing 13 so that said key will be properly guided and steadied in its operation.

In the operation of the apparatus or trap it being understood, of course, that normally the cage or closure is beneath the floor level or in lowermost position with the platform or foot piece 18 in the same plane with the floor 14 and in this position the said cage or closure is concealed from view, the rods 66 having been turned for the jaws 67 to engage the said cage or closure. Also the gear train 55 with the motor 56 is out of mesh therewith. It is preferable to have the audible signals 72 located at a police station and the audible signals 73 arranged or located outside of the bank building. These audible signals 73 are sounded from an electric motor driven phonograph or talking machine 85 conveniently located within the bank building. The motor of the talking machine 85 is arranged in the circuit with the audible signal which is in the nature of a bell and at its location can be supplemented by a visual signal 86. An unauthorized intruder when approaching the vault 78 steps upon the platform or foot piece 18 which is directly in front of the entrance to said vault and by the closing of the normally open switches 77 the audible and visual signals become active and those visual signals at the teller's desk or cage 76 give warning to the bank personnel so that upon operation of any one of the switches 75 which are normally open or the switch 79 within the vault 78 the motor 58 will become active and at the same time the load upon the platform or foot piece 18 will actuate the key 48 unlocking the members 43 from the cage or closure A. The motor 58 in its operation turns the rods 66 releasing the jaws 67 and under the weights 28 the cage or closure A will rise or become elevated for trapping the intruder upon the platform or foot piece 18. The turning of one of the rods 66, through the arm 69 actuates the switch 71 which is normally closed and this opening of said switch shuts off the motor 56. Synchronously therewith the arm 68 actuates the switch 70 which is normally open for the closing thereof so that the audible and visual signals will be flashed. The platform or foot piece 18 under its depression closes the switches 77 for an instant flashing of the audible and visual signals as before stated. The offset portions 37 of the plungers 34 when actuated by the trips 32 engaging the abutments 31 will close the trap doors 12 at the top of the cage or closure A and the latches 29 will lock these in the closed position so that the intruder trapped within the cage or closure can not make an escape through the open top thereof. When it is desired, after the arrest of the intruder or the latter has fallen into the hands of the law, to have the cage or closure A return to normalcy or lowermost position an authorized person manually releases the latches 29 and opens the trap doors 12 and thereafter manually operates the switch 80 for the closing of the same to effect the operation of the motor 56. Under this motor operation the cords or cables 54 will wind on the windless shaft 53 causing the lowering of the cage or closure A beneath the floor 14. When the cage or closure A reaches its lowermost position it acts upon the switch 80 to automatically open the same and thus render the motor 56 inactive. It is, of course, understood that prior to closing the switch 80 the gear train 55 will be brought into driving condition with the motor 56 and when the switch 80 is open this gear train 55 is moved out of driving condition with said motor. The switches 70 and 71 which have been previously actuated by the arms 68 and 69 are properly set, the switch 71 being normally closed and the switch 70 normally open. The switches 75, are actuated by foot pressure and are manually returned to normal set position. This is also true with respect to the switch 79.

What is claimed is:

1. In an apparatus of the character described, a tread platform, a cage vertically movable about said platform and normally arranged below said platform, means for automatically raising or lowering the cage with respect to the platform, means controlled by the platform for locking the cage in elevated position, means holding the platform from movement when the cage is elevated, means automatically controlled by said cage for stopping movement of the latter, spring tensioned leverage beneath the platform for sustaining it in actuating position before being trod upon, and trap doors closing the top of the cage and automatically actuated to closed and to latched position when the cage is in raised or elevated position.

2. In an apparatus of the character described, a tread platform, a cage surrounding and movable above and below said platform, means automatically moving the cage, means locking the cage in lowered position, means controlled by the platform for freeing the cage for movement, means automatically controlled by said cage for stopping movement of the latter in its vertical movement in both directions, spring tensioned leverage beneath the platform for sustaining it in actuating position before being trod upon, trap doors closing the top of the cage and automatically actuated when the latter is about the platform, and a stationary housing beneath the platform for guiding the movements of the cage, and said housing being enclosed by the cage when in lowered position.

3. In an apparatus of the character described, a tread platform, a cage enclosing said platform and vertically movable above and below said platform, means automatically elevating and lowering the cage, means automatically controlled by said cage for stopping movement of the latter, spring tensioned leverage beneath the platform for sustaining the cage in lowered position before said platform is trod upon, trap doors closing the top of the cage and automatically closed and latched when the latter is fully elevated, a stationary housing beneath the platform and guiding the cage about the latter, the housing being enclosed by the cage when said cage is in lowered position, motor mechanism operative for effecting the moving of the cage, and latches for holding the cage when said cage is in its fully raised or lowered positions and said latches being automatically controlled by said platform.

4. In an apparatus of the character described, a horizontal tread platform, a cage surrounding and movable about said platform, means automatically moving the cage above and below the platform, means controlled by the platform for freeing the cage for movement, means for moving the cage and automatically controlled by said cage for stopping movement of the latter, spring tensioned leverage beneath the platform for sustaining it in actuating position before being trod upon, trap doors for closing the top of the cage when the cage is in elevated or raised position, and said doors being swingable in a line with but extending upwardly from the sides of the cage below the platform when the cage is lowered and automatically closed and latched over the top of the cage when the latter is raised to its full extent above the platform, a stationary housing beneath the platform and guiding the cage about the latter, the housing being enclosed by the cage when said cage is in lowered position, motor mechanism operative for effecting the moving of the cage, latches for holding the cage with respect to the platform and automatically controlled by said platform.

5. The apparatus as claimed by claim 3 and in which the tread platform and a series of diagonal cross levers have their end pivoted respectively to the underface of the tread platform and to the housing, a rod depending in the housing having a saddle end to engage with the centers of central offset ends of said levers and said rod having a triangular key at its lower end, angle locking members pivoted at their angle portions to the housing and having offset ends to engage with the cage to hold said cage in lowered position in the housing, spring means influencing the free ends of the levers toward each other, adjustable elements on said ends of the levers to engage with the angle sides of the triangular key, and the closing means for the trap doors of the cage comprising push rods mounted for movement in the corners of the cage having offset portions to contact with the hinged ends of the trap doors, and pivoted trip means loosely connected to said rods and engageable with elements at the top of the housing for imparting an outward longitudinal movement to the rods.

HARRY JACKSON.
MARY E. JACKSON.